(No Model.)
C. G. ETTE.
HYDRANT.
No. 382,960. Patented May 15, 1888.
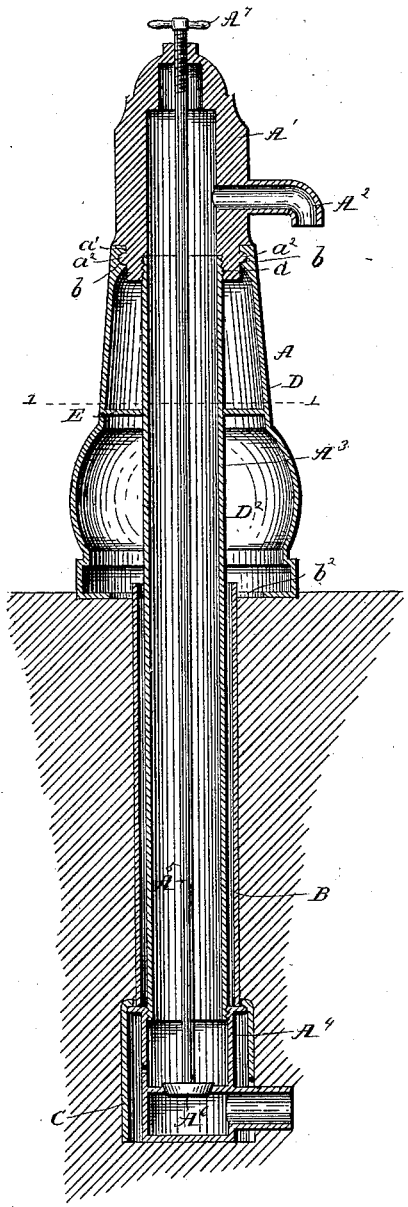
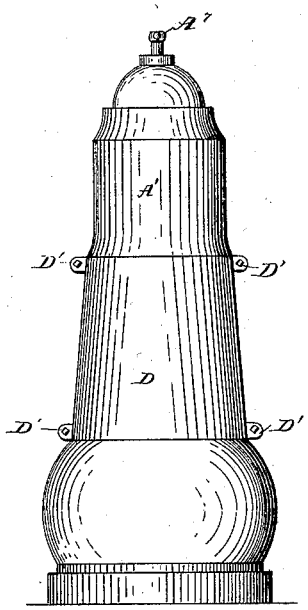
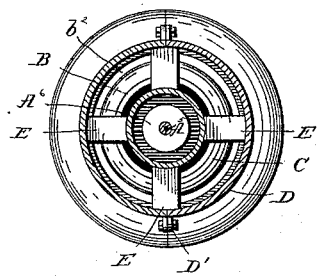
Witnesses.
Edwin L Bradford.
Wm L. Boyden.
Chas. G. Ette.
Inventor.
Chas E. Barber
By his Attorney. Atty.

UNITED STATES PATENT OFFICE.

CHARLES G. ETTE, OF ST. LOUIS, MISSOURI.

HYDRANT.

SPECIFICATION forming part of Letters Patent No. 382,960, dated May 15, 1888.

Application filed August 8, 1887. Serial No. 246,440. (No model.)

*To all whom it may concern:*

Be it known that I, CHARLES G. ETTE, a citizen of the United States, residing at St. Louis, in the State of Missouri, have invented certain new and useful Improvements in Hydrants, of which the following is so full, clear, and exact a description as will enable others skilled in the art to which my invention appertains to make and use the same, reference being had to the accompanying drawings, in which—

Figure 1 is a sectional elevation of a hydrant with a frost-casing and its protecting-casing secured thereto. Fig. 2 is a side elevation of that portion of the hydrant situated above the ground. Fig. 3 is a transverse section on the line 1 1 of Fig. 1.

Similar letters of reference denote corresponding parts in the several figures.

The object of my invention is to construct a frost-case for hydrants which will cover and protect the entire portion of the hydrant situated in the ground, and which will be raised by the thawing of the frost in the ground.

Another object of my invention is to provide means for preventing the entrance of water, ice, or gritty substances into the frost-case when it is raised by the thawing of the frost.

The objects, generally, of my invention are to obviate certain difficulties heretofore experienced in devices of this character and to construct a hydrant frost-casing which will accomplish its purpose in a better and more perfect manner and without straining the hydrant.

To these ends my invention consists in certain peculiarities in the construction, arrangement, and combination of the various parts, substantially as will be hereinafter fully described, and then more particularly pointed out in the claims at the end of the specification.

Referring to the drawings, the hydrant proper, A, is composed of the top section, A', (having the nozzle or vent $A^2$,) the main hydrant-pipe $A^3$, the valve-chamber $A^4$, and the valve-rod $A^5$, carrying the valve $A^6$, and they are secured together preferably in the following manner, to wit: The lower portion of the top section, A', is made smaller in its outside diameter than the upper portion, as shown in Fig. 1, and is provided with a screw-thread, $a$, into which is adapted to be secured the upper portion of the main hydrant-pipe $A^3$, the lower end of which connects with and is secured to the valve-chamber $A^4$, preferably by screw-threads.

The valve-rod $A^5$ extends the entire length of the hydrant, and is operated by a handle, as $A^7$, secured to its upper end. The lower portion of the top section, A', is provided with a groove, $a'$, and a raised circular or other shaped lip, $a^2$.

I do not wish to be understood as limiting myself to the exact construction of hydrant herein shown and described, as I may substitute any of the other well-known forms of hydrants without departing from the spirit of my invention.

B represents a movable frost-casing, which is formed of a round hollow or circular tubing or pipe, placed around main hydrant-pipe $A^3$, loosely encircling it, and made of sufficient length to reach from valve-chamber $A^4$, upon which it rests, to immediately above the ground-line of the hydrant. Beneath this movable casing B is a second casing, C, for the purpose of protecting the valve-chamber $A^4$. Obviously this second casing, C, may or may not be attached to the casing B, as desired.

Heretofore when the frost-casing of hydrants was heaved or raised by the thawing of the frost in the ground it was oftentimes clogged or choked by water, ice, or gritty substances entering the frost-casing through its top and freezing, clogging, or choking it up, making it immovable, and rendering it useless in its essential feature—that of being movable upwardly without a corresponding strain on the hydrant. To obviate this difficulty the hydrant is provided with an upper casing, D, preferably made in two parts, secured together by bolts, screws, or rivets, as D', and having a groove, $b$, to correspond with and fit over lip $a^2$ in the top section, A', and it is also preferably provided with bridges or lugs E, situated about midway of its length, and so constructed as to fit around main hydrant-pipe $A^3$ and throw the lower half of casing sufficiently away from pipe $A^3$ to form a chamber, $D^2$, having an opening, $b^2$, in its lower extremity, through which the frost-casing will pass in its passage upward when raised by the thawing of the frost. The inner lower portion of the casing D is formed with lugs or projections E, which limit the upward movement of the sliding casing B, which casing has also an enlarged chamber, $D^2$, which forms an air-chamber for the accommodation of dead-air at this point to prevent freezing, and which also allows the dirt to fall back off from the upper portion of the sliding frost-casing B. Obviously by this arrangement the entrance into the frost-casing of any substance liable to choke or clog it is prevented, so that it can at all times be raised without any strain upon the hydrant. It will also be obvious that the upper casing, D, will form a protector for that portion of the hydrant situated above the ground, and that it can be readily and easily removed for the purpose of permitting the movable frost-case to be driven back into the ground after it has been heaved or raised a number of times, or for any other purpose, without the necessity of taking up the hydrant or ground.

Having now described the uses, construction, and advantages of my invention, what I believe to be new, and desire to secure by Letters Patent, and what I therefore claim, is—

1. In a hydrant, a main water-pipe and a nozzle-section provided with a projection on the outside below the nozzle, in combination with casings made in sections, said casings having a corresponding recess at upper end to encircle the projection of nozzle-section, and having inwardly-projecting lugs below, said casings secured together and to the nozzle-section, substantially as described.

2. In a hydrant, a water-pipe and nozzle-section, in combination with a vertically-sliding frost-casing and an outer casing open at the bottom, made in sections, and provided with inwardly-projecting lugs, and an enlarged chamber below said lugs, substantially as and for the purposes specified.

In testimony that I claim the above as my invention I hereunto set my hand in the presence of two subscribing witnesses.

CHARLES G. ETTE.

Witnesses:
E. H. THORP,
JNO. B. HEITKAMP.